United States Patent [19]

Maier

[11] Patent Number: 4,457,264
[45] Date of Patent: Jul. 3, 1984

[54] COLLAPSIBLE AND PORTABLE MANGER

[76] Inventor: Marie L. Maier, 935 Sprague, Buhl, Id. 83316

[21] Appl. No.: 291,279

[22] Filed: Aug. 10, 1981

[51] Int. Cl.³ .............................................. A01K 5/01
[52] U.S. Cl. ................................... 119/58; 119/52 R
[58] Field of Search .................... 119/52 R, 58, 60, 61

[56] References Cited

U.S. PATENT DOCUMENTS

| | | | |
|---|---|---|---|
| 23,386 | 3/1859 | Parker | 119/61 |
| 476,265 | 6/1892 | Hall | 119/58 |
| 493,040 | 3/1893 | Morse | 119/51.5 |
| 591,792 | 10/1897 | Stitzer | 119/61 |
| 692,382 | 2/1902 | Swinton | 119/58 |
| 786,557 | 4/1905 | Goede | 119/61 |
| 988,599 | 4/1911 | Shaw | 119/60 |
| 1,018,095 | 2/1912 | Brown | 119/60 |
| 1,049,963 | 1/1913 | Young | 119/61 |
| 1,129,761 | 2/1915 | Toule | 119/60 |
| 3,362,382 | 1/1968 | Frasier | 119/58 |

FOREIGN PATENT DOCUMENTS

| | | | |
|---|---|---|---|
| 5030 | of 1889 | United Kingdom | 119/61 |
| 13119 | of 1894 | United Kingdom | 119/61 |
| 103797 | 2/1917 | United Kingdom | 119/61 |
| 828872 | 2/1960 | United Kingdom | 119/61 |

Primary Examiner—Paul J. Hirsch

[57] ABSTRACT

A portable and collapsible manger which is assembled from bottom, front, left and right side plates attached by means of piano hinges to a back plate wherein a manger enclosure is formed, together with a hay rack attached between the side plates to facilitate the loading and feeding of fibrous feeds.

1 Claim, 4 Drawing Figures

COLLAPSIBLE AND PORTABLE MANGER

BACKGROUND OF THE INVENTION

1. Field of the Invention

This invention relates to a means for providing a collapsible and portable manger for use in feeding horses, livestock, and other animals customarily fed grains, hays, grass feeds, and specially prepared feeds which are used with rumenoid animals. The manger is designed to be easily transported, assembled and placed in position by one person. It is also designed for easy disassembly into a collapsed storage position wherein it is flat and takes a minimum of space so as to be convenient for transport in the storage compartments of a livestock trailer or for hanging from a travel rack.

2. Description of the Prior Art

The use of mangers for the feeding of grains, hay and other feeds to livestock has been a continuing practice since the domestication of animals at the beginnings of civilization. The manger is a convenient apparatus for monitoring the amount of feed being fed to the animal, eliminating waste and spoilage caused by the animal stepping on the feed, allowing for the convenient feeding of small grains such as rolled oats, and for prohibiting the animal from becoming too selective in which portions of the feed it chooses to eat.

Mangers are particularly useful in confinement situations such as small corrals and stalls, both indoors and exposed to the weather. Most permanent corral facilities and stalls have incorporated into their permanent structure some type of manger arrangement. Mangers become particularly important with close confinement in that they usually provide a convenient means of presenting feed to the horse, cow or other livestock while minimizing the risk of getting kicked, stepped on or pushed against the wall or fence by the animal being fed. Typical manger devices provide for loading the feed into the manger from outside the stall, usually from behind or from a loft area above.

Problems develop when conventional manger facilities are not available as for example when horses are brought together for purposes of breeding or when an owner is traveling with his horse. Conventional manger facilities oftentimes are not available to those who are trail riding, attending horse shows, fairs, rodeos, parades, camping or hunting.

Also, sanitation and sterilization practices are nearly impossible when conventional manger facilities are used to treat infected or diseased horses.

A portable horse feeder has been developed in the past as is disclosed by M. O. Frazier, U.S. Pat. No. 3,362,382. However, such feeders are cumbersome and bulky to transport. This is especially true when traveling with a horse, since storage space can be, and usually is, severly limited.

3. Objects of the Invention

Accordingly, it is an object of this invention to provide a portable manger which can be easily assembled, without tools, for use in situations where conventional manger facilities are unavailable or unsuitable. Additionally, it is an object of this invention to provide a portable horse feeder which can be readily collapsed to a flat box adaptable for easy storage in a number of locations both within storage areas of a horse or livestock trailer or for hanging on the outside by use of clips and other fasteners.

An additional object of this invention is to provide a portable manger which can be easily cleaned and disinfected.

SUMMARY OF THE INVENTION

These objects are achieved through the use of a manger which is assembled from a series of plates to form the container for holding feed and hay. Central to the structure is a back plate to which the remaining sides and bottom are attached by means of piano hinges. The sides extend out as does the bottom and front plates to form the manger enclosure.

A hay rack, swinging free from a pivotal horizontal rail provides a means of stacking hay or other feeds in the manger in a manner which minimizes waste from the hay being pitched out and prevents selective feeding by the animal.

Collarstops sleeved over the bottom rail of the hay rack are positioned so that the side plates are precluded from collapsing against the back plate when the hay rack is installed in its pivot holes in the side plates. Outward collapse of the side rails is precluded by tabs extending up and toward the back plate from the base and frontal plates. The base and front plates are locked into position by means of a pin and clip assembly thereby locking the side plates against both the inside collars and the outside tabs, thus forming a ridged structure.

DETAILED DESCRIPTION OF PREFERRED EMBODIMENTS

Figure 1:
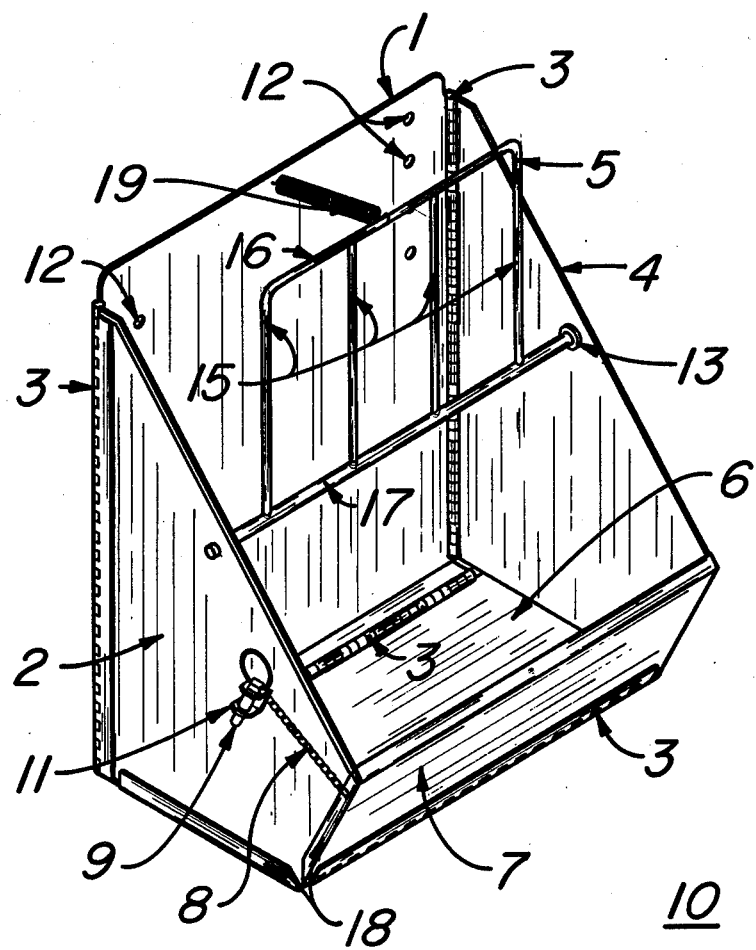
FIG. 1 is a prospective view showing the manger in its assembled state.
Figure 2:
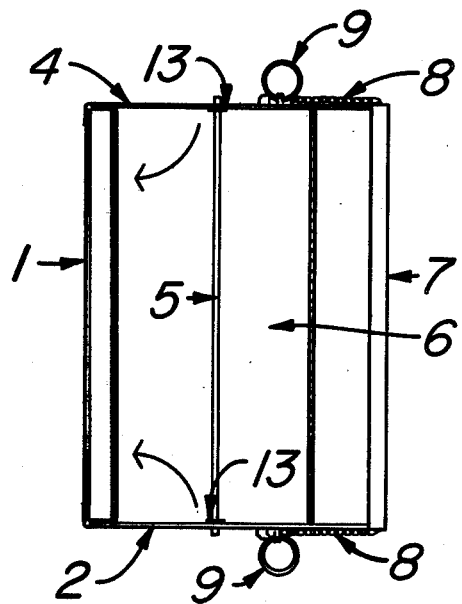
FIG. 2 is a top view.
Figure 3:
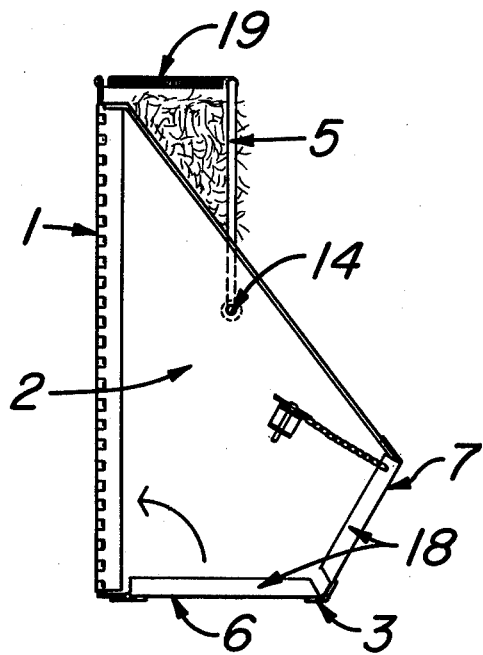
FIG. 3 is a side view in an assembled state.

First referring to FIGS. 1 and 3, back plate 1 of manger 10 is substantially retangular in shape and the main structural support member of the manger 10. Holes 12 are provided in the back of back plate 1 to facilitate hanging the portable manager on the side of a corral, stall or horse trailer. Piano hinges 3 attach left side plate 2 and right side plate 4 to back plate 1. The hinges 3 are designed to facilitate the collapsing of left side plate 2 and right side plate 4 against back plate 1 as shown in FIG. 2.

Figure 4:
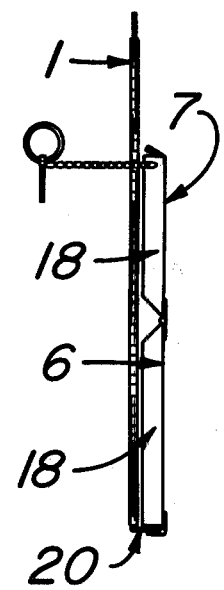
FIG. 4 is a side view in a disassembled state.

Base plate 6 is also attached to back plate 1 by use of a piano hinge 3. Base plate 6 is shown extended in FIGS. 1 and 3. FIG. 4 shows base plate 6 in the stored position. Note that back plate 1 has, at its bottom, tab 20 which is perpendicular to the plane of back plate 1 and provides an extension of the location of piano hinge 3 which affixes base plate 6 to back plate 1 so that base plate 6 will store parallel to base plate 1 without interference from tabs 18.

The hay rack, generally identified as 5 in FIGS. 1 and 2 is comprised of bottom rail 17, a polarity of vertical rails 15 and a swing rail 16 as shown in FIG. 1. Referring to FIGS. 1 and 3, bottom rail 17 of hay rack 5 extends through pivot holes 14 in the left side plate 2 and the right side plate 4 at a height which allows for convenient feeding underneath the hay racks. Spring 19 connects the swing rail 16 of hay rack 5 to back plate 1, to provide a compression rack to hold the feed in the manger. In this manner the animal feeds either from the bottom or attempts to pick at the feed between the vertical rails 15, but is precluded from pitching out onto the ground, large quantities of feed. Spring 19 is easily disconnected from swing rail 16, thus permitting the hay rack 5 to be pivoted out around the axis of bottom rail 17 for convenient loading of feed into the manger. This configuration facilitates the loading of the manger with variable amounts of hay or other feed in such a manner that the horse or other animal cannot selectively feed from various stalks or preferred leaves of the hay or feed and while still providing adequate space to load adequate amounts of feed.

The collarstops 13, as shown on FIGS. 1 and 2 are positioned to preclude the left side plate 2 and right side plate 4 from collapsing inward when the hay rack 5 is installed in the manger.

Frontal plate 7 is attached by piano hinge 3 to base plate 6 in such a manner as to allow it to be brought up against the extended left side plate 2 and right side plate 4 as shown in FIGS. 1 and 3, or to be extended out into the same plane as base plate 6 for storage as shown in FIG. 4.

As shown in FIGS. 1 and 2, pins 9 are attached to front plate 7 by chains 8. Pins 9 are used to secure the frontal plate 7 to the left side plate 2 and right side plate 4 through clips 11. The use of pins 9 and clips 11 provides an upward and inward force against front plate 7 thereby securing both front plate 7 and base plate 6 to the left side plate 2 of and right side plate 4. When so secured, tabs 18 on base plate 6 and front plate 7 engage the outside of the side plates 2 and 4 thereby preventing outward collapse of the side plates 2 and 4. As can be readily seen the collars 13 prohibit inward movement, and tabs 18 outward movement, thereby fixing the location of the side plates without the use of mechanical fasteners requiring hand tools.

Disassembly of manger 10 is accomplished by the removal of pins 9 from clips 11 which subsequently results in the release of base plate 6 and front plate 7 from the assembled position. Once this is accomplished the side plates 2 and 4 can be swung outward releasing hay rack 5 from its assembled position.

Side plates 2 and 4 are then folded against back plate 1, hay rack 5 is then laid atop the folded side plates 2 and 4, and base plates 6 and 7 are then folded against back plate 1 as shown in FIG. 4. As can be seen tab extension 14 facilitates a folding of bottom plate 6 and front plate 7 against back plate 1 with sufficient clearance to cover the hay rack 5.

Not shown in the drawings is the use of an additional clip similar to clips 11 on the back of back plate 1 for use of pins 9 to lock the manger 10 in its folded position.

Having thus described in detail a preferred design which embodies the concepts and principals of the invention, and which accomplishes the various objects and purposes thereof, it is to be appreciated and will be apparent to those skilled in the art that many minor physical changes can be made in this invention without altering the inventive concepts or principals embodied herein. Hence it is intended that the scope of this invention be limited only to the extent indicated in the appended claims.

What I claim is:

1. A collapsable and portable manger comprising:
   a back plate disposed in a substantially verticle position; and
   left and right side plates rotatably attached to the left and right sides of the back plate for outward extension therefrom for use as a manger or for storage in a collapsed position against the back plate, wherein each side plate has in it a hole for receiving in pivotal relation the bottom rail of a hay rack at a height suitable to allow animals to feed beneath it; and
   a bottom plate rotatably attached to the bottom of the back plate for outward extension therefrom for use as a manger or for storage in a collapsed position against the back plate; and
   a front plate rotatably attached to the front of the base plate for extension therefrom for communication with the lower portions of the left and right side plates; and
   a hay rack having a bottom rail disposed in a horizontal position and a polarity of verticle rails attached to and extending upwardly from the bottom rail and a swing rail attached to the tops of the verticle rails wherein said bottom rail has ends suitable for insertion into the holes of the left and right side plates in pivotable relationship therewith at a height suitable to allow animals to feed from beneath the hay rack; and
   a spring removable connecting the swing rail of the hay rack to the back plate so as to provide a means of holding animal feeds within the manger against the back plate; and
   collarstops attached to the bottom rail inside of the points where the bottom rail is in pivotal relationship with the left and right side plates so as to preclude the collapse of the left and right side plates when the hay rack is installed between the left and right side plates; and
   tabs extending upwardly from the sides of the bottom plate, when the bottom plate is in its extended position and in communiction with the left and right side plates, wherein said tabs are also in communication with the outsides of the left and right side plates so as to preclude the outward movement of the left and right side plates; and
   tabs extending inward from the sides of the frontal plate, when the frontal plate is in its extended position and in communication with the left and right side plates, wherein said tabs are also in communication with the outsides of the left and right side plates so as to preclude the outward movement of the left and right side plates; and
   pins flexibly attached to the front plate for removable attachment to the side plates for holding the front plate against the side plates in a position wherein the bottom plate is also in communication with the bottom of the left and right side plates.

* * * * *